Aug. 16, 1927.
W. B. SHEA
1,638,885
SAFETY APPLIANCE GAUGE
Filed Jan. 15, 1925
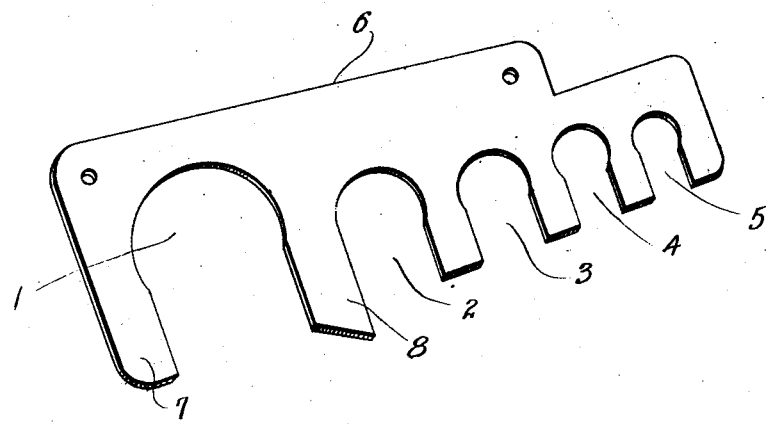
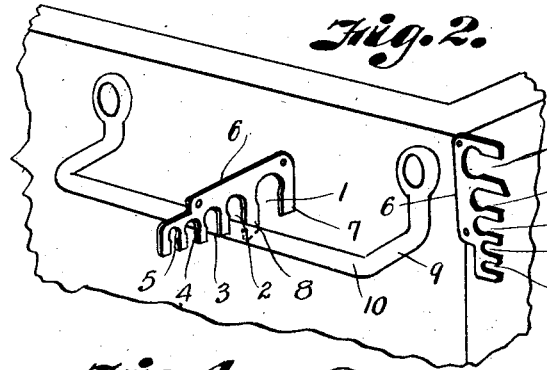
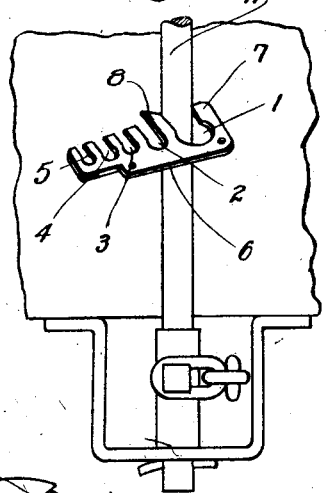
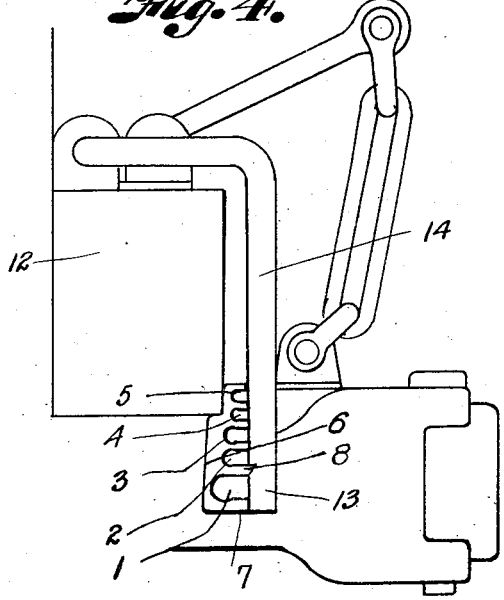
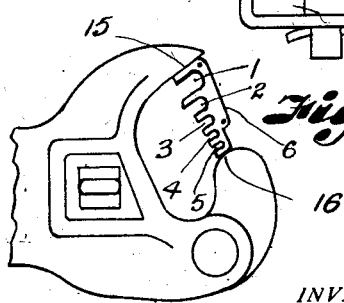
INVENTOR
William B. Shea
BY
ATTORNEY Patented Aug. 16, 1927.

1,638,885

UNITED STATES PATENT OFFICE.

WILLIAM B. SHEA, OF KANSAS CITY, MISSOURI.

SAFETY-APPLIANCE GAUGE.

Application filed January 15, 1925. Serial No. 2,571.

This invention relates to a safety appliance gauge especially designed for gauging diameters of the various safety devices used on railway trains.

Under the Interstate Commerce Commission order approved April 14, 1910, and subsequent orders it is imperative that various safety devices, such as handles for couplers, brake-shafts, brake-shaft trunnions, hand-holds, ladder-treads, brake-rods, rod-ends and chains, brake-chains and clearances for hand-holds, have certain dimensions. These dimensions are well understood by the manufacturers of cars and the like but in use the devices wear so the dimensions are less than required by the Interstate Commerce Commission. When this occurs the user is liable to a fine so it becomes necessary to have frequent inspection of these various devices and to this end my invention consists in providing an inexpensive light gauge, preferably struck from a single piece of sheet metal, for example about $\frac{1}{16}$ of an inch in thickness so that the inspector may have a tool at hand for measuring the various safety devices and thereby reduce the inspection with operations to a minimum time requirement.

The illustrated embodiment of my invention will be clearly understood by reference to the following description in connection with the accompanying drawings, in which—

Fig. 1 is a perspective view of a gauge constructed in accordance with my invention.

Fig. 2 is a perspetcive view of a portion of a car showing a hand-hold and the gauge in position to measure the distance between the hand-hold and the car.

Fig. 3 is a fragmentary view of a brake-shaft showing the gauge in position to measure the diameter.

Fig. 4 is a side view of a coupler showing the gauge in position to measure the coupler handle, and Fig. 5 is a plan view of the coupling showing the position of the gauge for measuring the gap between the tip of the movable jaw and the face of the rigid jaw to gauge the contour.

The gauge is shown as comprising a piece of sheet metal having one edge cut away to provide notches 1, 2, 3, 4 and 5. The notch 1 is of a width to measure the diameter of a brake shaft. Notch 2 is of a width to measure the diameter of a brake shaft trunnion. Notch 3 is of a width to measure the diameter of a hand-hold, ladder-treads, etc. Notch 4 is of a width to measure the diameter of chain links on rod end of chain. Notch 5 is of a width to measure the diameter of brake-chains. The straight edge 6 of the sheet is of a length to measure the minimum length of a handle of an uncoupling lever for the coupler and it is off-set with respect to the maximum length of the gauge because the gauge will be longer than the edge 6. The distance between the outer edges of teeth 7 and 8 will be equal to the required distance of the clearance of the hand-hold. This is shown in Fig. 2. A hand-hold is designated 9 and it has a bar 10, the upper hand-hold must be approximately 4 inches from the top of the car, four inches being the length of the edge 6. The vertical gauge in Fig. 2 is shown to measure this distance.

In Fig. 3 the gauge is shown as applied to brake-shaft 11, the notch 1 receiving the brake-shaft so that the inspector may determine whether or not there is play between the two edges of the notch, it being obvious if there is play the diameter of the brake-shaft will be less than the diameter required by the law.

In Fig. 4 I have shown the gauge as resting against the sill 12 to measure the overlapping end 13 of the handle 14, the alignment of the ends of teeth produced by cutting notches 2, 3, 4 and 5 being here disclosed. For this purpose the edge 6 is used. The manner of using the gauge will be clearly apparent to those skilled in the art, it being obvious that the notches are especially designed for various members constituting the numerous safety devices employed on cars. The length over all is five and one eighth (5⅛) inches to measure coupler contour. The examples given are only some to which the invention may be put as it is obvious there are other uses to which it may be applied, the main use however is for measuring the devices as above explained.

In Fig. 5, I have shown the gauge as in position to measure the gap between the tip of the movable jaw and the face of the rigid jaw of a car coupling. The distance between the two must not be over 5⅛ inches otherwise the couplers will not pass inspection because whenever the gap is in excess of 5⅛ inches there is liability of accidental uncoupling. The rigid jaw is shown at 15 and the movable jaw is shown at 16.

One of the novel features of the invention is that it is made from a single piece of sheet metal.

What I claim and desire to secure by Letters Patent is:—

In a caliper gauge comprising a flat metallic body having a plurality of teeth having aligned ends formed on a portion of one edge thereof and progressively spaced thereon, the inner opposed edges of said teeth forming external diameter gauges, an elongated tooth on said edge adjacent the said porton and a tooth on the end of said edge opposite said elongated tooth, the inner edges of said two last named teeth forming an external gauge and the outer opposed edges thereof constituting an internal gauge.

In testimony whereof I affix my signature.

WILLIAM B. SHEA.